(12) United States Patent
Fletcher et al.

(10) Patent No.: US 7,047,257 B2
(45) Date of Patent: May 16, 2006

(54) COMPUTER FILE MANAGEMENT SYSTEM

(75) Inventors: Thomas O. P. Fletcher, Ottawa (CA);
Peter H. Van Der Veen, Kanata (CA);
Dan Dodge, Ottawa (CA)

(73) Assignee: QNX Software Systems, Ottawa (CA)

( * ) Notice: Subject to any disclaimer, the term of this patent is extended or adjusted under 35 U.S.C. 154(b) by 586 days.

(21) Appl. No.: 09/824,252

(22) Filed: Apr. 3, 2001

(65) Prior Publication Data
US 2002/0143795 A1    Oct. 3, 2002

(51) Int. Cl.
*G06F 17/30* (2006.01)
(52) U.S. Cl. .................. 707/201; 707/200; 707/202
(58) Field of Classification Search ............. 707/200, 707/201, 1; 345/843, 821
See application file for complete search history.

(56) References Cited

U.S. PATENT DOCUMENTS

| | | | |
|---|---|---|---|
| 5,313,646 A | 5/1994 | Hendricks et al. | |
| 5,355,497 A | 10/1994 | Cohen-Levy | |
| 5,544,360 A | 8/1996 | Lewak et al. | |
| 5,603,019 A | 2/1997 | Kish | |
| 5,694,563 A * | 12/1997 | Belfiore et al. | 345/821 |
| 5,742,817 A | 4/1998 | Pinkoski | |
| 5,832,515 A * | 11/1998 | Ledain et al. | 707/202 |
| 5,873,085 A | 2/1999 | Enoki et al. | |
| 5,886,699 A * | 3/1999 | Belfiore et al. | 345/843 |
| 5,905,990 A | 5/1999 | Inglett | |
| 5,956,515 A | 9/1999 | Beals et al. | |
| 5,996,054 A * | 11/1999 | Ledain et al. | 711/203 |
| 6,021,408 A * | 2/2000 | Ledain et al. | 707/8 |
| 6,055,363 A | 4/2000 | Beals et al. | |
| 6,058,400 A * | 5/2000 | Slaughter | 707/201 |
| 6,321,219 B1 * | 11/2001 | Gainer et al. | 707/3 |
| 6,356,915 B1 * | 3/2002 | Chtchetkine et al. | 707/200 |
| 6,363,400 B1 * | 3/2002 | Chtchetkine et al. | 707/200 |
| 6,365,915 B1 * | 4/2002 | Hirai et al. | 257/59 |
| 6,385,625 B1 * | 5/2002 | Slaughter | 707/201 |
| 2002/0065840 A1 * | 5/2002 | McBrearty et al. | 707/202 |

OTHER PUBLICATIONS

Ramesh Govindan "A file system for continuous media", ACM, vol. 10, No. 4, Nov. 1992, pp. 311-337.*
Paul et al., Using properties for uniform interaction in the presto document system.*

(Continued)

*Primary Examiner*—Jean M. Corrielus
(74) *Attorney, Agent, or Firm*—Brinks Hofer Gilson & Lione

(57) ABSTRACT

Computer systems with multiple users will typically store various versions of the same software; different versions being required for different platforms and to maintain compatibility with other software applications. These computer files are generally organized in a hierarchical structure to make their location and access easier, but this still results in a very complicated and inefficient system. The invention provides a custom file system which allows each user, node or system, to identify and manage only the files that are pertinent to it. This custom filesystem provides a custom hierarchical structure of files and folders, and links back to the real file locations in the main file system. The custom file system has priority over the main file system, in that a process manager will attempt to address requests on the custom filesystem before trying to place them on the main filesystem.

4 Claims, 8 Drawing Sheets

OTHER PUBLICATIONS

Paul et al., "Extending document management systems with user specific active properties".*

Article from Sunworld.com entitled "A file by any other name", http://www.sunworld.com/sunworldonline/swol-09-1995/swol-09-sysadmin.html, Oct. 18, 2000.

Article entitled "A Samba VFS Tutorial", http://samba.cadcamlab.org/lists/samba-docs/Aug2000/00004.html, Oct. 19, 2000, pp. 1-12.

A tutorial on Unix file systems, "Filesystems", http://www.uwsg.Indiana.edu/usail/peripherals/disks/titlesystems/index.html, Oct. 18, 2000, 7 pages.

"Frequently Asked Questions on Windows Registry System", wysiwyg://452/http://www.regedit.com/help/, Oct. 18, 2000, pp. 1-6.

"UNIX Filesystems without I-Nodes", Volker Lendecke, Dr. Dobb's Journal, Feb. 1997, pp. 1-4.

* cited by examiner

COMPUTER FILE MANAGEMENT SYSTEM

The present invention relates generally to computer file management, and more specifically to a system and method of customized computer file management.

BACKGROUND OF THE INVENTION

Most computer systems store data by physically encoding it as a data file on a storage device such as a hard magnetic disk. The software tools used to perform this storage and the subsequent access to, or manipulation of, the data file, are provided by a routine called a file system manager which is usually included in an operating system.

An operating system is a program or collection of programs which allow control of the computer's physical devices. In a UNIX™-based system, the operating system interacts directly with the hardware providing common services to programs and isolating the software and users from the hardware idiosyncrasies of a particular computer system. For example, the operating system may coordinate the sending of information to a printer to be printed, or commence the operation of an application program. Operating systems also have some manner of interface to communicate with the user, generally via a command line on the computer's monitor where the user can enter an instruction from the operating system's instruction set, or via a graphic user interface which presents a simpler means of entering the same kinds of instructions.

The file system management functions of the operating system (or simply, the file system manager) provides a standardized means of storing and accessing data on storage subsystems, being responsible for handling all requests to open, close, read, and write files. These data files are referred to by symbolic filenames which tell the operating system where the data can be physically found. HPS, FAT, FAT32, NTFS and HPFS are common file systems used on personal computers.

In many computer systems, data files are sorted into a structure of folders, directories, subdirectories or similar categories, making them easier to identify and locate. In these systems, each file has a unique path name which identifies its location within the file structure, access to the data generally starting at the top and proceeding through the levels of the hierarchy. Most operating systems use these types of tree-like or hierarchical filing systems, including the UNIX, MS-DOS™, OS/2™, Windows™ NT™,95™ and 98™, and Macintosh™ operating systems.

UNIX and MS-DOS computers, for example, have a "root" directory from which all other directories or subdirectories branch out. The syntax of the path name is usually a sequence of directory or filenames separated by the "/" character, each subsequent entry representing another level of the tree. For example, referring to FIG. 1, the path name "/main/songs/myfile" identifies a file named "myfile" that is located in the "songs" subdirectory, which is located in the root directory "main". Often the organization and revisions of software applications are built into the path names.

A typical UNIX environment has a single file system. In a network environment which includes several users, there still may be only one file system, referred to as a Network File System (NFS). Typical file systems suffer from a number of problems which result in the inefficient use of computer and network resources, and difficulties in their use.

In most environments, for example, the users do not require access to all of the available files on a regular basis, rather they use a small subset. Hence, existing file systems present a large volume of unneeded information which only serves to obscure the files the user is trying to locate. In an attempt to address this problem, personal subdirectories are used to store personal files such as archived email and word processing documents, placing them in an easily identifiable location. Personal subdirectories may also be implemented with access restrictions, for example, allowing access only by the particular user and the system administrator.

However, personal subdirectories do not solve the problem of managing applications software. While storing separate copies of applications software for each user in a personal location would allow users or systems to easily locate the software and safely make modifications, it would be tremendously demanding of system resources. Clearly, this method would not scale well for larger networks, and it would take a great deal of time to implement a version upgrade as all of the personal copies would have to be upgraded separately. Furthermore, it would be quite easy to lose track of software versions, or confuse older versions of programs with new versions.

There is also the possibility that users or systems will modify or damage files which should not be changed as other users or systems require them to be in their original form. This can be prevented by designating files as write-protected which prevents any modifications from being stored, but some files must be modified by other software programs to operate properly, so they cannot be protected in this way. Hence, to avoid accidental and permanent damage to an original file, it is common to create a personal copy of a file the user wishes to modify. If this file ever becomes damaged it can always be replaced with another copy of the original. As noted above, this method is very resource intensive as the storage memory must store a separate copy of the software for each of the end users. This solution is not scalable or flexible, and results in a inconsistent number and location of software versions which is very difficult to administer.

Another file management problem is the administration of software products that are available in many versions, as new features are added or performance is improved. Each version will typically rely on a separate set of source code, including components such as libraries, patches and support files. An example is presented in FIG. 2, where three software packages are stored in a "drawing" subdirectory: first and second versions of a drawing package (draw_1.4 and draw_2.0 respectively), and a format converting package (convert_2.2). Related files are also stored in this subdirectory: software tool sets for the two drawing packages (drtools_1.4 and drtools_2.0), a software patch for the first drawing package (drpatch_1.4), and a font set for the second drawing package (drfont_2.0). As software applications often consist of dozens of files which are installed with numerous subdirectories, it is clear that the management of these files can be immensely more complex than that suggested by this example.

An example of such a set of subdirectories is presented in FIG. 3, for the software application of "draw_1.4" (for the sake of simplicity, the two higher levels "main" and "drawing" are not shown). This application has two top-level directories "bin" and "etc" which are platform independent, and might contain files such as shell scripts in the "bin" subdirectory and configuration files in the "etc" subdirectory. A directory may have any arbitrary name, but the convention is for a "bin" directory to be one which contains files stored in binary format, that is, computer-readable and not human-readable files. This application also has three top-level directories which are hardware architecture platform dependent: "x86", "mips" and "ppc". For platform-specific files, the CPU type is encoded as part of the pathname, for example, for x86-specific binaries, the pathname x86/bin is used. The balance of the identified directories store related files required by the draw_1.4 application, both the /mips/ and /ppc/ subdirectories, of course, having similar structures to that of the /x86/ subdirectory.

When a network administrator attempts to perform a system-wide upgrade of a software application, it may not be desirable or possible for all systems to move to the new version. They may, for example:
1. have legacy software or hardware that is not compatible with the new version;
2. not want to spend time learning how to operate the new version, particularly if it offers then minimal improvements over the last version; or
3. expect difficulty in removing the old version. When an application is removed or uninstalled from the system it is a tedious process to actually remove all of the files which have been modified.

Therefore, it may be necessary for the network administrator to make multiple versions of the same software available.

In an effort to simplify the process of software installation and uninstallation, some file systems, such as Microsoft Windows 95 and NT operating systems, use a registry database to store configuration information. Most software applications write data to this registry, particularly during installation. However, these tools actually physically manipulate the software application files on disk when installing, so they require personal copies which vary from one user to the next. Like the proposals noted above, making multiple copies is not a scalable or flexible solution, and results in a inconsistent number and location of software versions which is very difficult to administer.

Hence, there is a need for an improved system and method of computer file management for computers and computer networks. Traditional computer networks included personal computers, laptop computers, terminals, servers, mainframes, scanners, printers, data storage units and the like. The current trend though is to converge many forms of computers, communication devices and appliances onto a single network including personal digital assistants, Internet ready cellular telephones, hardwired telephones, and television set top boxes. This will make the need for such an improved system and method even greater as these devices could potentially run on different architectures and require different binary formats of the same files.

SUMMARY OF THE INVENTION

It is therefore an object of the invention to provide a novel method and system of computer file management which obviates or mitigates at least one of the disadvantages of the prior art.

One aspect of the invention is broadly defined as an improvement in a computer system having a memory for storage of files and a main filesystem for accessing said files, the improvement of adding a custom filesystem comprising: a custom hierarchical structure of files and folders; and a set of links between said custom files and the locations of corresponding real files in said main file system; said custom file system having priority over said main file system, in that a process manager will attempt to address requests on said custom filesystem prior to placing said requests on said main filesystem.

Another aspect of the invention is defined as a method of preparing a custom filesystem for a computer system, comprising the steps of: generating and storing a file of attributes for said computer system; selecting required software applications from available software applications in accordance with said attributes; and linking said selected software applications to said custom filesystem.

Another aspect of the invention is defined as a custom filesystem comprising: means for generating and storing a file of attributes for said computer system; means for selecting required software applications from available software applications in accordance with said attributes; and means for linking said selected software applications to said custom filesystem.

A further aspect of the invention is defined as a method of operation for a custom filesystem comprising the steps of: loading a system configuration file; responding to receipt of a request to perform an operation by: accessing said system configuration file; re-directing said requested operation to a corresponding real file location; and performing said requested operation with respect to said real file.

BRIEF DESCRIPTION OF THE DRAWINGS

These and other features of the invention will become more apparent from the following description in which reference is made to the appended drawings in which.

DETAILED DESCRIPTION OF THE INVENTION

Figure 4:
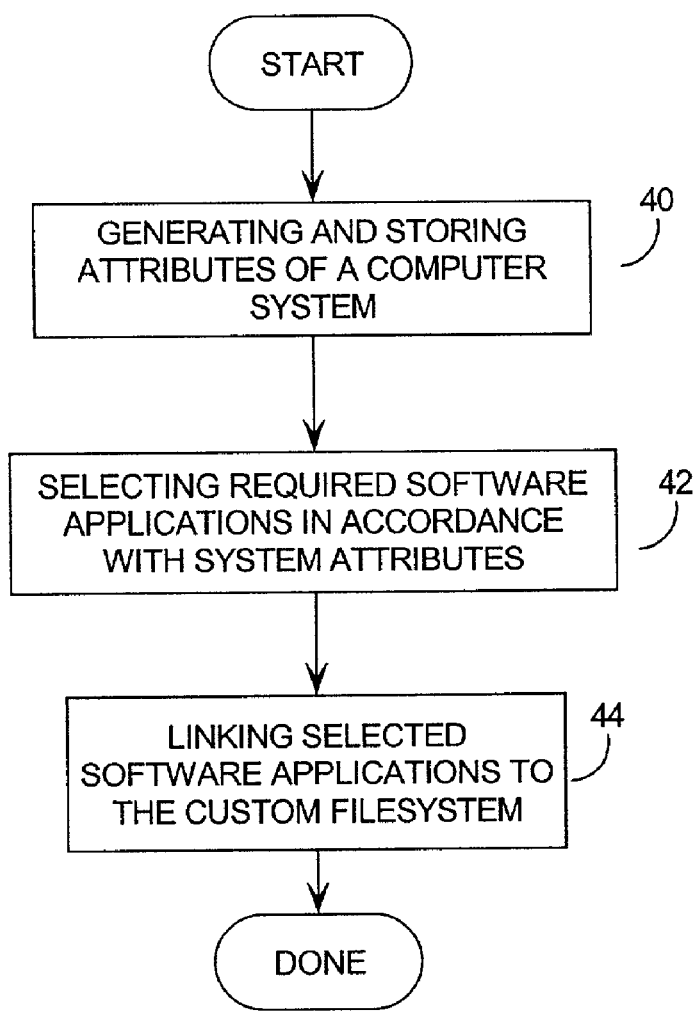
FIG. 4 presents a flow chart of a broad embodiment of the invention.

A method which addresses the objects outlined above, is presented as a flow chart in FIG. 4. This figure presents a method of preparing a custom filesystem for a computer system, which can be laid over a main filesystem. This custom filesystem is initiated by generating and storing a file of attributes for said computer system at step 40. As will be explained in greater detail hereinafter, these attributes may include the system platform, and preferences regarding which versions of available programs the system wishes to view. Because the custom filesystem is preferably laid over a regular file system, all files ultimately can be viewed.

Next, the custom filesystem selects software applications from available software applications which the system requires, in accordance with the system attributes, at step 42. Those links are then created on the custom file system, to link the selected software applications to their real-world locations at step 44. Because the custom filenames are linked to the main filesystem, no special tools or modifications to the main filesystem are required.

Instructions can now be entered which refer to files on the custom filesystem using a technique known in the art, such as via a graphical user interface, command line interface, or via another software program. Hence, no API (application programming interface) changes are required. As will be explained hereinafter, if a received instruction does not include a custom filename, regular execution is performed by other file system managers, and if an instruction does include a custom filename, then the instruction is re-directed to the corresponding real software file location.

The method of the invention will be more clear from the detailed description which follows, but generally, the invention provides a file system which presents a customized view of a set of real files and directories to a system or end user. The real files are stored on some physical medium such as a hard magnetic disk, local or remote file server or the like, and the invention presents selected files in the format the system requires. Of course, the full complement of real files may still be accessible to the system via some other file system.

The custom file system of the invention may be associated with any identifiable entity or entities on a computer network. Depending on the computing environment, these may include, for example: users, clients, computers, system or nodes. In a personal computer (PC) environment, it may be appropriate to associate the custom file system with individual users (users generally being synonymous with nodes in a typical PC environment). In the interest of simplicity, the custom file system of the invention will be described herein as correlating with a particular "system", though it is clear that the custom file system may be associated with any identifiable entity or entities.

As noted in the Background to the Invention above, filenames are generally defined by their hierarchical path in the actual file system. In the method of the invention, a custom file system (including custom filenames and custom file paths) is generated which is particular to the system/user. These custom filenames are linked to real software file locations which have been selected in accordance with the system's attributes.

As will be explained in greater detail hereinafter, the system's attributes may be divided into two groups:

static characteristics of the system such as the microprocessor model and operating system platform; and dynamic characteristics such as which of the accessible software applications that system should have on its custom file system, and the versions of those software applications.

The dynamic characteristics are qualities that are queried from the client requesting access to a custom file system, and are controlled by the server. That is, static generally refers to the system characteristics, and dynamic generally refers to the client characteristics.

In a UNIX environment, information about each file in the file system is kept in a special structure called an inode (for "information node"), and filenames simply point to their respective inodes. The inode contains a pointer to the disk blocks containing the data in the file, as well as other information such as: the type of file, the permission bits, the owner and group, the file size, and the file modification date and time. In UNIX, a directory or subdirectory is just a special type of file containing a list of filenames and associated inodes. When a system attempts to access a given file by name, the filename is looked up in the directory, where the corresponding inode is found. This allows multiple filenames to point at the same inode, so custom filenames can be generated which have arbitrary (or custom) paths, but point to the same inode.

When the operating system receives an instruction that includes a filename, the file system must locate the file. In UNIX environments, this is done by performing a component by component search of the directory. Each instruction calling a filename or directory must be examined to find a match or determine that the file or directory does not exist. Lookup is done one component at a time because any of those directories could be a mount point or a symbolic link, taking the pathname resolution to another file system or another machine.

"Mounting" a file system means taking a file system and mapping it to an existing directory in the file tree, called the mount point. Once a file system is mounted at a given mount point, the file tree of that file system is accessed as if it is contained in the directory serving as the mount point. Mount points are typically empty directories, as the contents of a directory serving as a mount point will be inaccessible while the new file system is mounted there.

A symbolic link is a special file that has a pathname as its data. When the symbolic link is named in a request such an open request, the link portion of the pathname is replaced by the link's "data" and the path is re-evaluated. Symbolic links are a flexible means of pathname indirection and are often used to provide multiple paths to a single file. Unlike hard links, symbolic links can cross file systems and can also create links to directories. Hard links are confined to one filesystem, linking one inode to another.

The method of the invention may be employed in many different operating systems, and on many different physical file systems including networked environments with multiple computers or multiple file servers. In fact, it is more practical to apply the invention in large networked environments where there are a number of different file servers, each of these file servers containing a variety of different software both in terms of different vendors, versions and platform binaries. The invention adds a small amount of overhead which becomes less and less significant as the main file system grows in size and complexity. This overhead only occurs during the initial connection phase, once connected there is no additional impact on performance.

Figure 1:
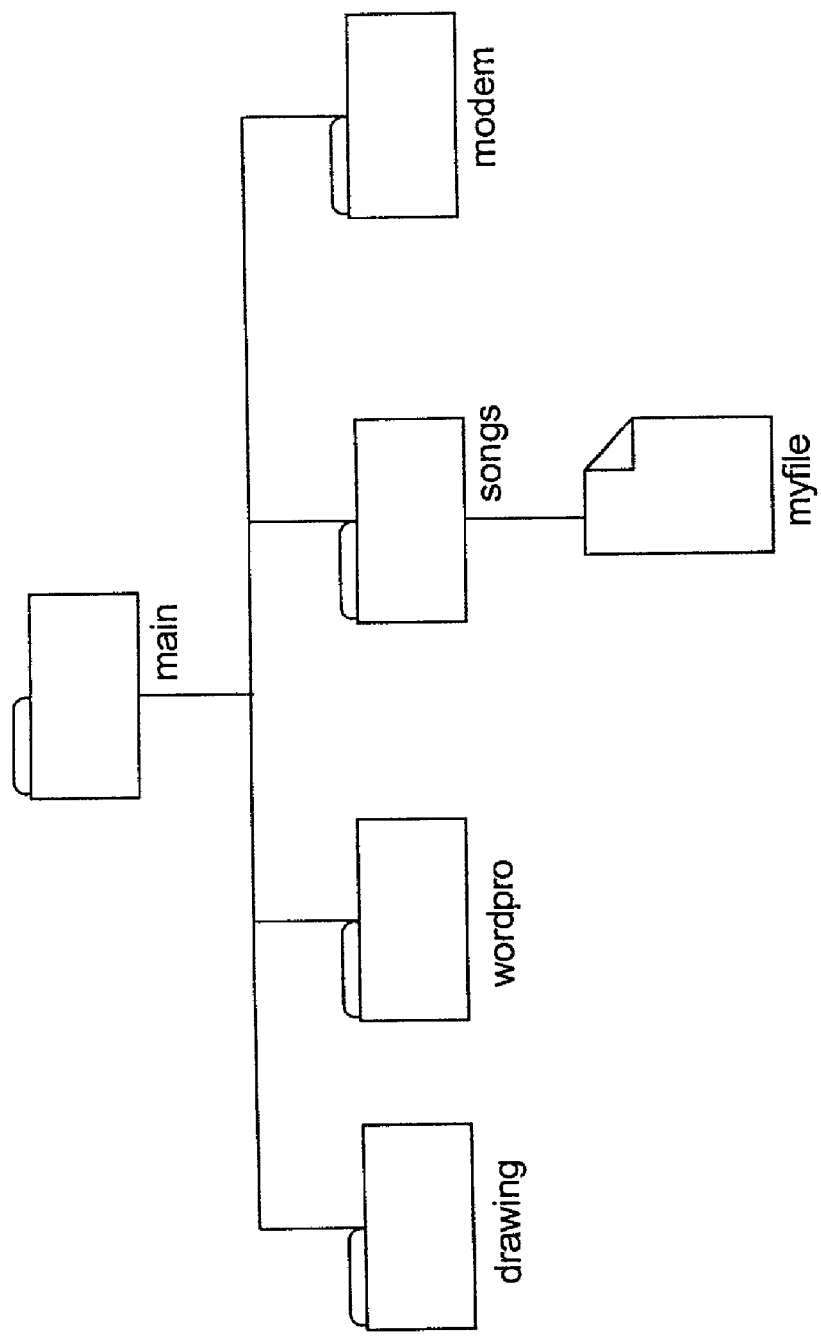
FIG. 1 presents a schematic diagram of an exemplary file structure as known in the art.
Figure 2:
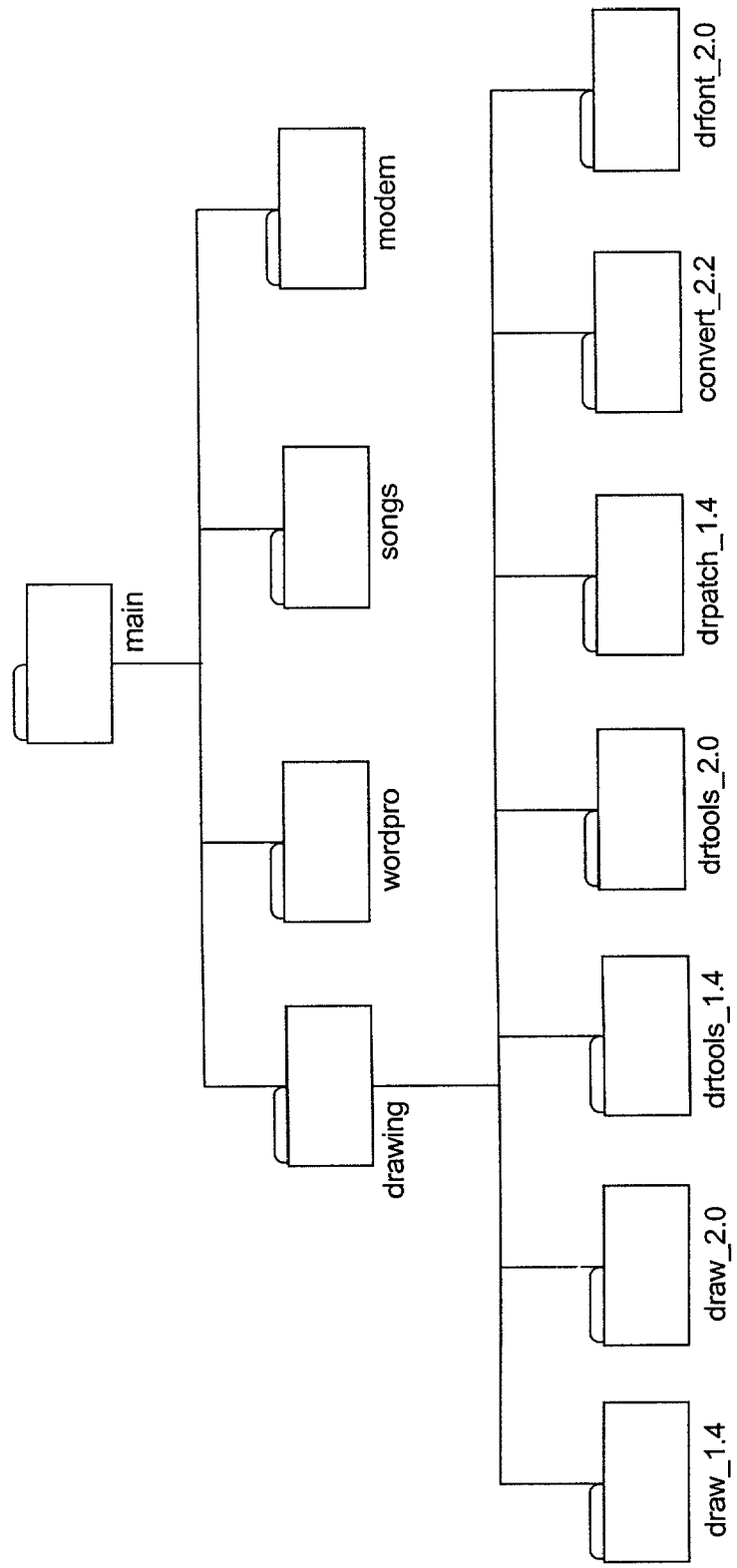
FIG. 2 presents a schematic diagram of an exemplary file structure as known in the art, including seven subdirectories for three software applications.
Figure 3:
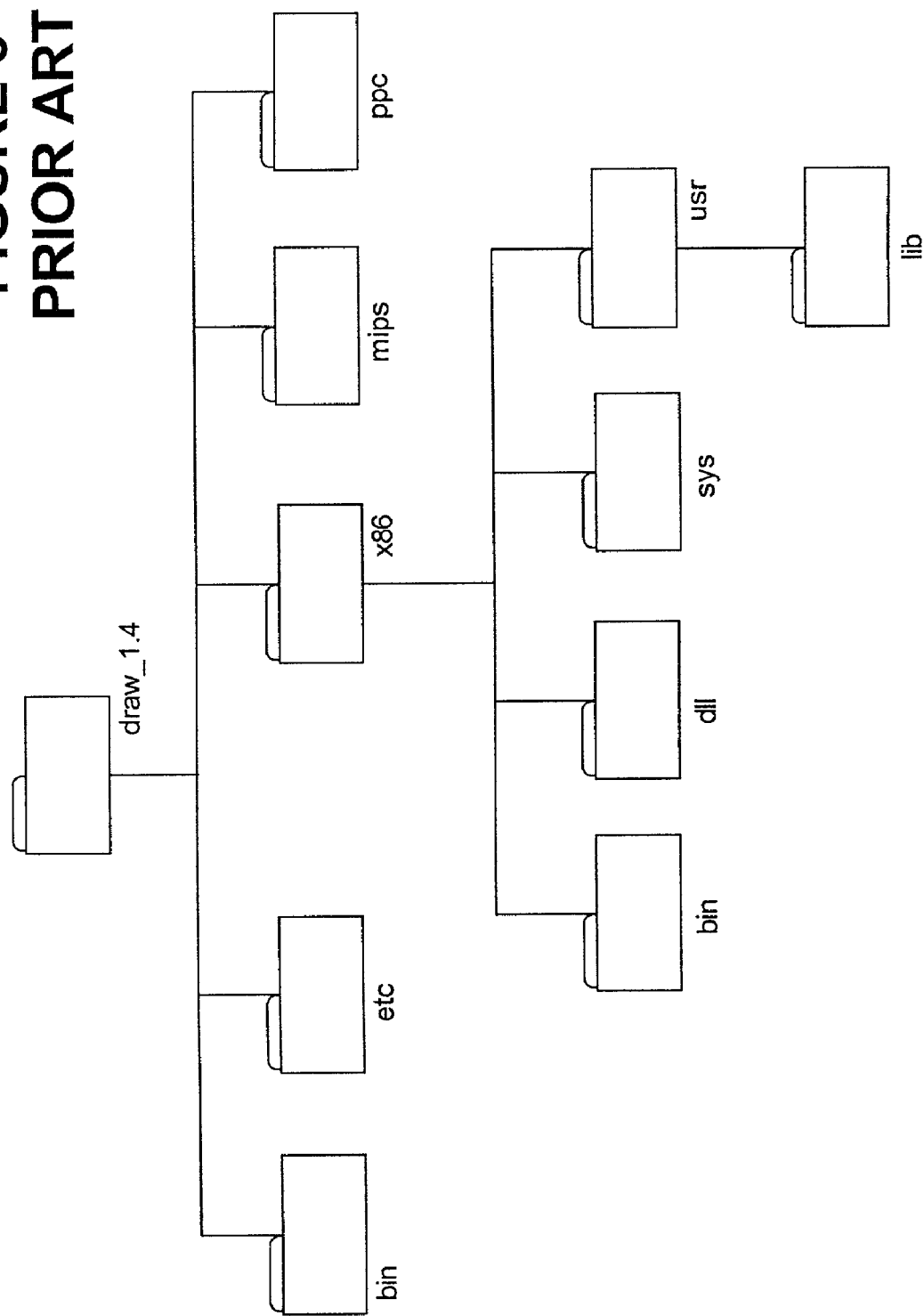
FIG. 3 presents a schematic diagram of an exemplary file structure as known in the art, including a portion of a file hierarchy for a drawing application.
Figure 5:
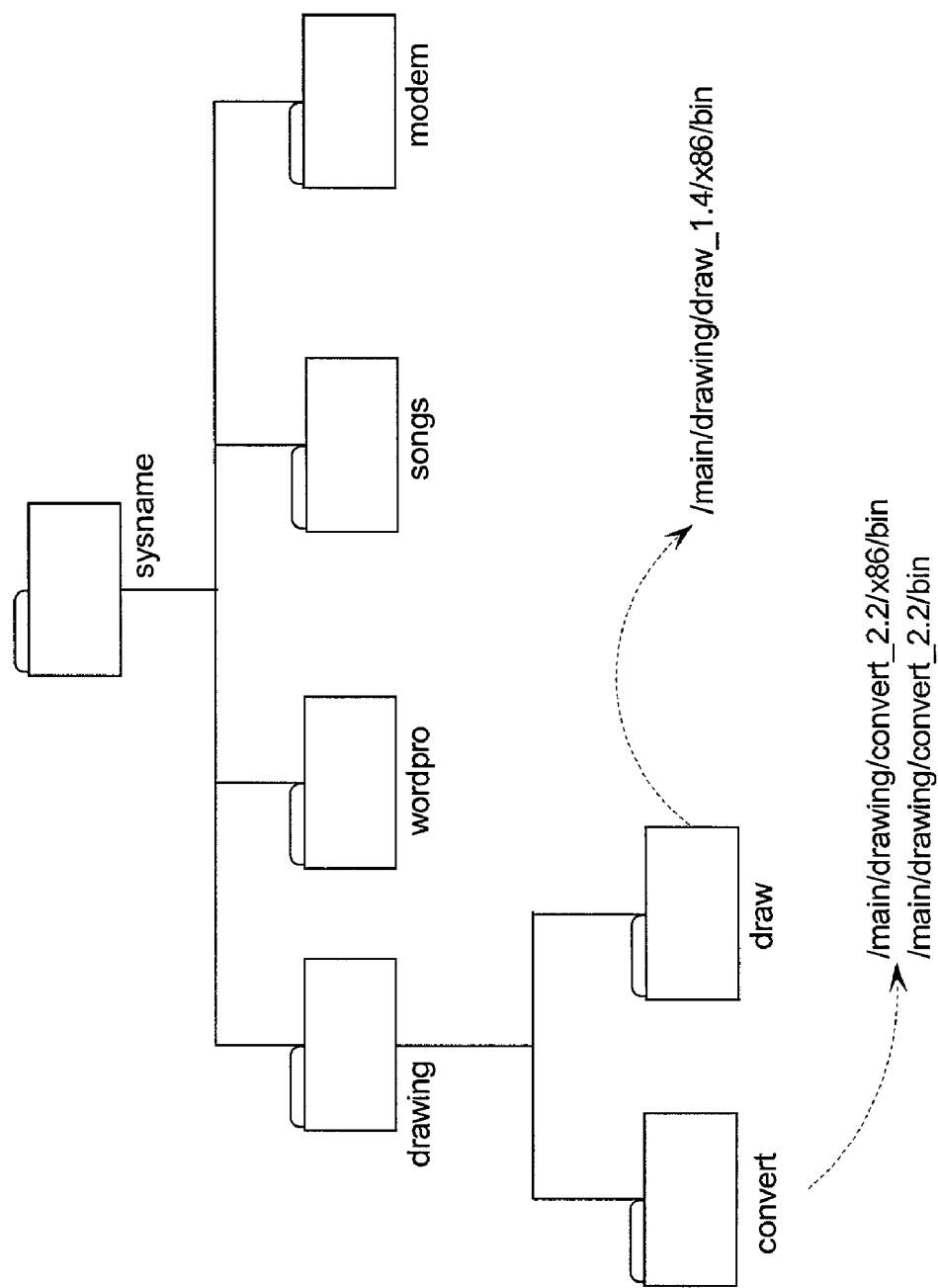
FIG. 5 presents a schematic diagram of an exemplary custom file structure in an embodiment of the invention.

For example, a personal file system to complement the file system of FIGS. 2 and 3, could be generated as per FIG. 5. Note that the root level of the original file system in FIG. 2 is labelled "main" as it is common to all systems, while the root of the custom file system is labelled "sysname" in FIG. 5, which will generally be replaced with the name of the system associated with the custom file system. The next level of both file systems are the same, including directories for various software applications: "drawing", "wordpro", "songs" and "modem". It is not necessary to rename the root of the file system to implement the invention, in fact, it is preferable not to rename the root. Renaming is done in this example in the interest of clarity.

At the next level however, rather than presenting all three software applications including seven subdirectories (per FIG. 3), the custom file system presents two directories which represent the two software applications that the system hypothetically wishes to access (convert_2.2 and draw_1.4). If the system has a x86 processor, these two sub-directories will be linked to their respective locations in the original directory as shown, sub-directory "draw" being linked to /main/drawing/draw_1.4/x86/bin, and sub-directory "convert" being linked to /main/drawing/convert_2.2/x86/bin. Clearly, there is far less confusion to the custom file system, as none of the detail of the file system of FIG. 3 appears. As well, when the system wishes to upgrade (say to draw_2.0), the re-direction changes but the view of the custom file system does not.

It is also possible, and in fact preferable, to include both processor specific and non-processor specific files in the same sub-directory or folder. For example, the sub-directory in FIG. 5 labelled "convert" could be linked to both the x86 system specific files at /main/drawing/convert_2.2/x86/bin, and to the general system files in sub-directory /main/drawing/convert_2.2/bin.

Because the invention provides a customized view of a set of files and directories, it provides many advantages over existing file systems:

1. it allows all versions of a software application to be stored on a server, each separate user system being able to determine which version it wants to use. Once selected, the system is not cluttered and the user is not confused by a number of different versions and their respective libraries, patches and support files because he only sees those which pertain to his selection. Providing this partial view of the complete file system removes complexity, making it easier for users and cleaning up the system;
2. the system does not have to track files or update registries when software is upgraded as in the case of Windows 95 and NT operating systems. The custom file system can be amended independently of whether or when new software is added to the file system;
3. roll-back is easily facilitated by storing an older version of a custom file system. This is useful for testing new versions of software and easily returning to the old version if necessary;
4. if the network must maintain software for different platforms, various custom file systems can be tailored to link only to files relevant to a given system's platform, so incompatibility errors are reduced;
5. updating software or changing to any given level of software patch is a single operation and the new software is immediately available for use. Existing systems generally require the software to be downloaded to the system's domain and to be customized at that point;
6. it is easy for any system to install and use new software or software updates. The custom files may remain consistent to the system, with the only changes being the actual destination file that the system is routed to when a request is made to operate on the file; and
7. systems which are running and accessing older versions of a given piece of software when it is ungraded, can continue to run until they release all of their handles to the old versions. New accesses will then access new versions of the software. This allows in-field updates with less system downtime.

The invention also encourages the development of software that is smaller, less complex and better performing. In the prior art, developers were forced to make their software as universal as possible so software had to test its environment, ask questions to the system during installation, and execute multitudes of decisions to execute according to this configuration. With the invention, the software developer can dispense with much of this complexity and write software code that is optimized for a particular platform. At the same time, the invention does not require any change to the system APIs (application programming interfaces), so software is consistent.

By putting the architectural knowledge in the file system rather than in the application the stored software is already tailored to a specific platform. Thus, there is less need to store personal copies, which saves memory and the complications associated with multiple copies being saved on different locations in the network. However, if a critical software application must be modified by a particular user or system, it is preferably copied to a specific directory hierarchy called the "spill" directory. More details with regard to this implementation are included hereinafter.

In an environment with a variety of machines and operating systems, possibly in a distributed computing environment, the invention also helps to facilitate communication by routing requests for software to the proper machine binaries. For example, the invention can be advantageously applied to an environment with QNX™ and Neutrino™ machines, which have the ability to transparently interact and communicate tasks to one another. The file system of the invention facilitates this communication even if the machines and files are located in totally different file systems.

The file system of the invention performs the appropriate re-direction of requests for files to the filename which contains the proper version/architecture that the system has requested. This concept can be realized on any computer system which allows one to perform file re-direction, preferably by creating a custom file system, though it is possible to obtain some of the benefits by using symbolic links. In general, using the system of the invention is an elegant way to add features to a file system, without having to know everything about the file system implementation.

Figure 6:
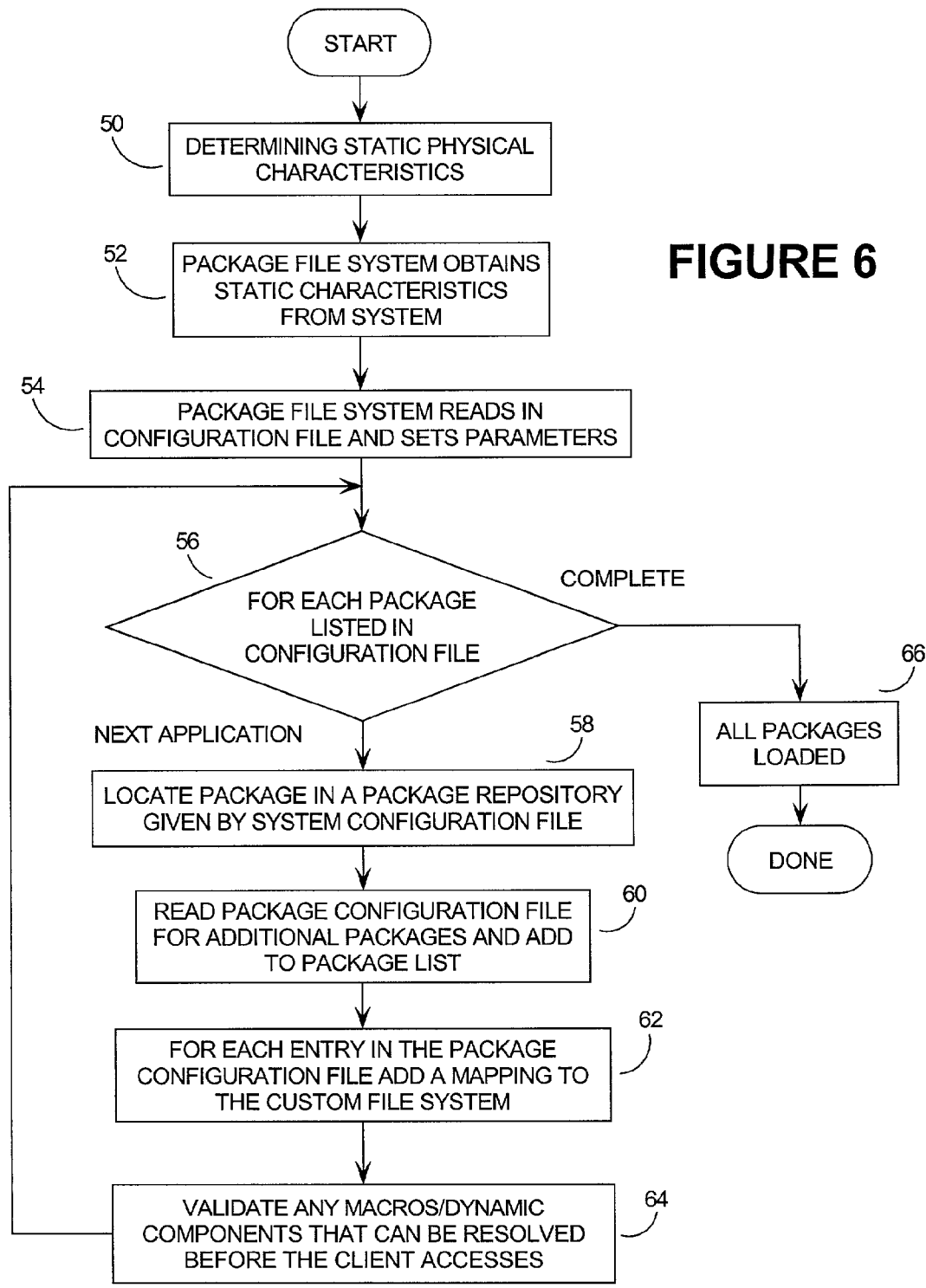
FIG. 6 presents a flow chart of a method of user file configuration in an embodiment of the invention.

An exemplary routine for setting up a system configuration file is now described with respect to the flow chart of FIG. 6. As noted above, the system's attributes consist of characteristics which are determined separately. In the general context, this system configuration file may also be referred to as a "node configuration file" as it represents the configuration for a system, which is presumed to be one node in a larger network sharing files from several remote servers.

Also, in the preferred embodiment of the invention, there is a second configuration file referred to as the "package configuration file" or package manifest, which is present for each package. A "package" is a collection of files and directories related to each other by virtue of being part of a software product or of a particular release or patch to a software product. For example, the Neutrino operating system, including its binary files and documentation, is considered a package (note that the development tools are generally considered to be a separate package). A patch to the operating system might contain only selected files and documentation (correlating with the files that have changed), so this would be considered a different package.

The package configuration file is generally prepared off-line, by the authors of the respective software, and describes the contents of the package. Its contents include a description of which components are platform dependant and which are not, which directories should be combined or merged, the value of symbolic links and related data for each entry.

The purpose of the package file system is to manage these packages in a manner such that various nodes can choose which packages they want to use. For example, one node might be a computer with a x86 microprocessor running with a graphic user interface (GUI), Photon™ version 1.14; patch level "A", and an operating system, Neutrino version 2.00; while another node might be a PowerPC computer running Photon version 1.14 with no patch level applied and Neutrino version 2.00. Since these computers have different CPU types, different types of executables are required in their /bin directories (one set of x86 executables and one set of Power PC executables) but also different contents are required based on which version of the software is desired and which patch levels have been applied.

Therefore, the package file system presents, on each node, a custom file system that contains only selected files from the master package database. The selection is controlled by a node configuration file, which indicates the packages that should be presented, the location of the master package database, and also where the custom file system should be rooted. When it is necessary to change the package lineup on a particular node, this can be accomplished by a simple and fast change to the system configuration file.

Preparation of the system configuration file begins with the step of determining the static physical characteristics of the node or system at step 50 of FIG. 6. These characteristics are determined in manners known in the art, and may be collected off-line, or by the operating system when a system is booted-up. This would include BIOS data, plug-and-play functionality, and a listing of software packages available.

Little description is provided herein as methods for collecting this data are well known in the art. Some of this data can be determined in an automated manner, for example, using the techniques employed by Plug-and-Play software and standard software installation methods, while other data can be obtained by querying the system. The static characteristics might include the microprocessor model and clock speed, memory available, and hardware devices, drivers and configurations such as sound, video and modem cards. The data obtained at this step may be collected by another software program long before the balance of this routine is performed, for example, by the operating system when the computer is being booted up.

At step 52 the package file system is then initiated as a software application, and obtains the static characteristics it requires, from the operating system. This data would generally by a subset of the data determined at step 50.

At step 54, the package file system then reads in the system configuration file which details the following start up information:

the root directory of the custom file system [cfsroot] which is where the custom file system is mounted. As noted above, filenames and paths are symbolic, so any name or path may be assigned;

the location of the package repositories (base root for the packages), which are the locations which are searched to look for packages;

packages to read and make accessible; and the root of the filesystem where files changed by the user are to be stored. This is the "spillroot".

The system then loops through all of the software packages available at step 56, as listed in the system configuration file. The packages themselves are located in one of the repositories, which are also specified in the system configuration file. For each package, the method performs the steps of:

locating a given package in the path given by package repository at step 58;

reading a package configuration file for additional packages (if necessary) and adding to package list at step 60;

for each entry in the package configuration file a mapping to the custom file system is added at step 62. This is the selection mechanism, where an external package installer program goes through and presents the user with a list of available packages;

validate any macros/dynamic components that can be resolved before the client accesses at step 64. Note at this point, dynamic versioning could be performed if required.

Once this looping is complete, the method exits the routine at step 66, at which point all of the desired packages are loaded, ending the routine. The custom file system then becomes active and is able to handle requests.

The method presented in FIG. 6 is exemplary and various implementations may have additional or different steps which would follow logically from this example. What is significant is that the system is able to determine which files/packages/ versions appear on the custom file system. For example, as new software applications are added to the file system, a smaller and simpler routine can be performed which cycles through steps 56–62. As well, additional steps may be added, for example, one may wish to query the user or system as to the suggested filename or path name for a given software application or package. This may be used to generate a more succinct or logical file hierarchy from the user's or system's perspective.

Figure 7A:
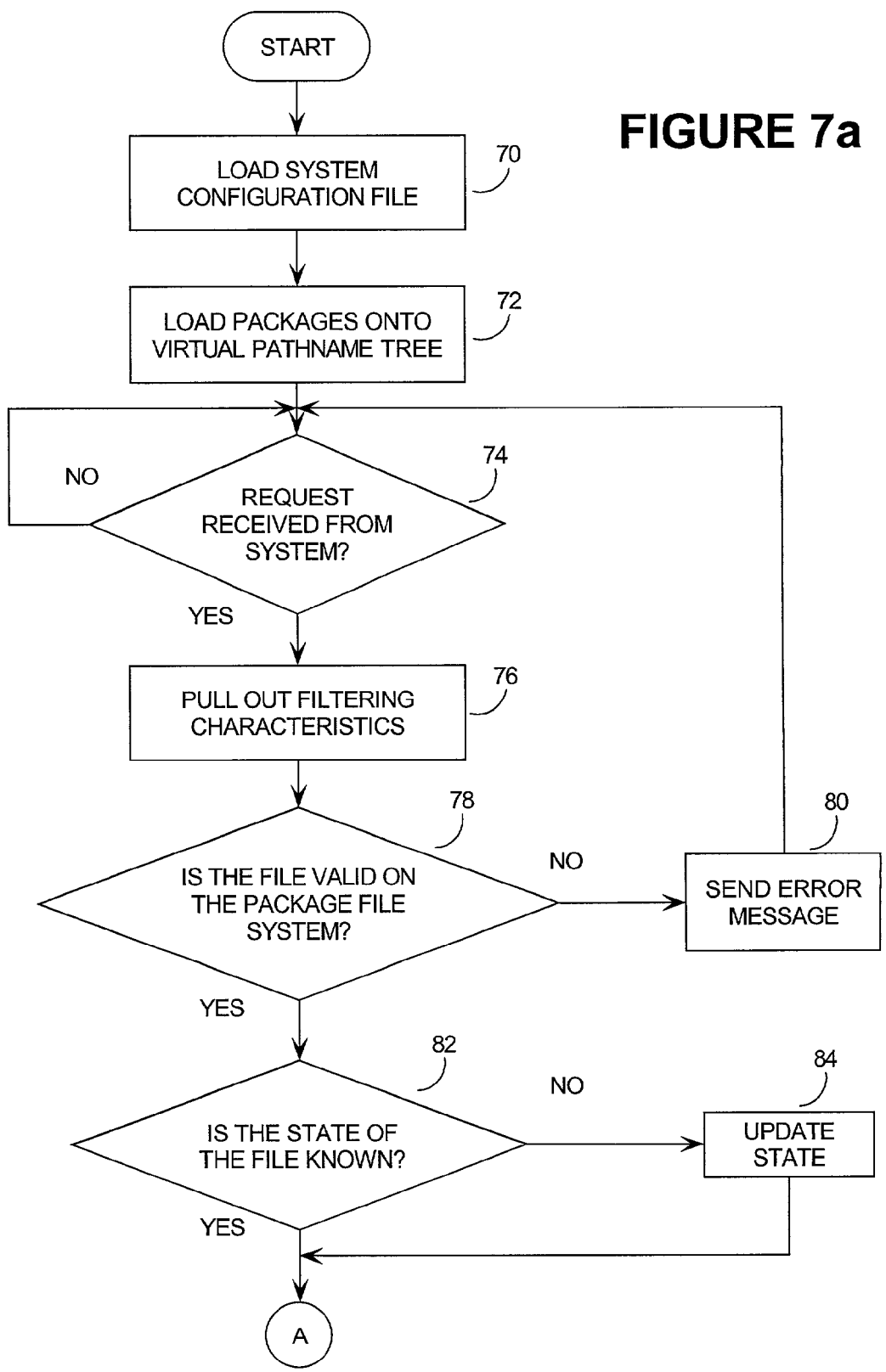
FIGS. 7*a* and 7*b* present a flow chart of a method of instruction code interpretation in an embodiment of the invention.
Figure 7B:
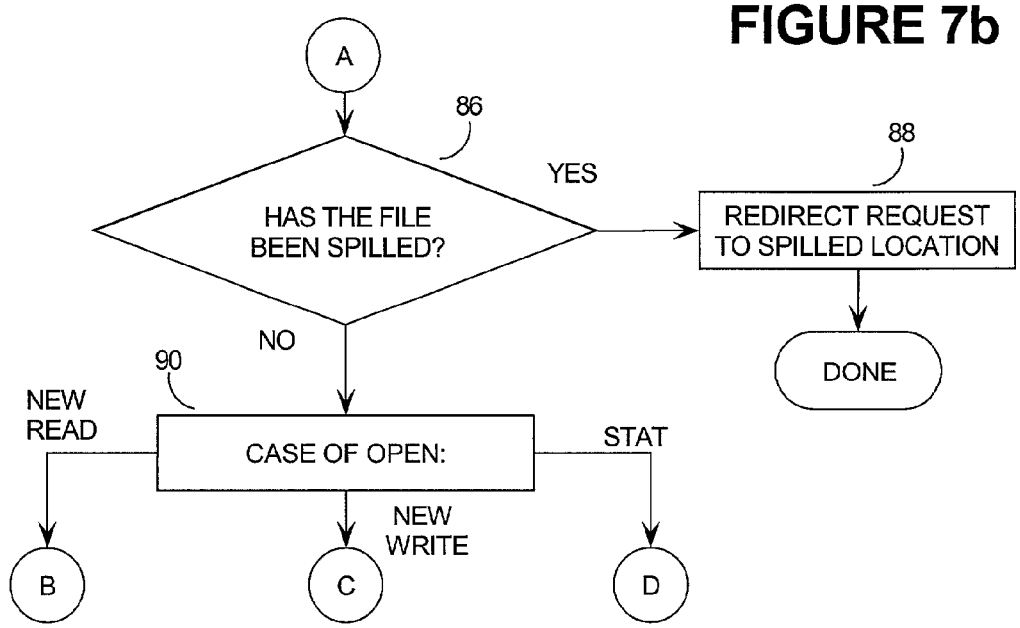
Figure 7B:
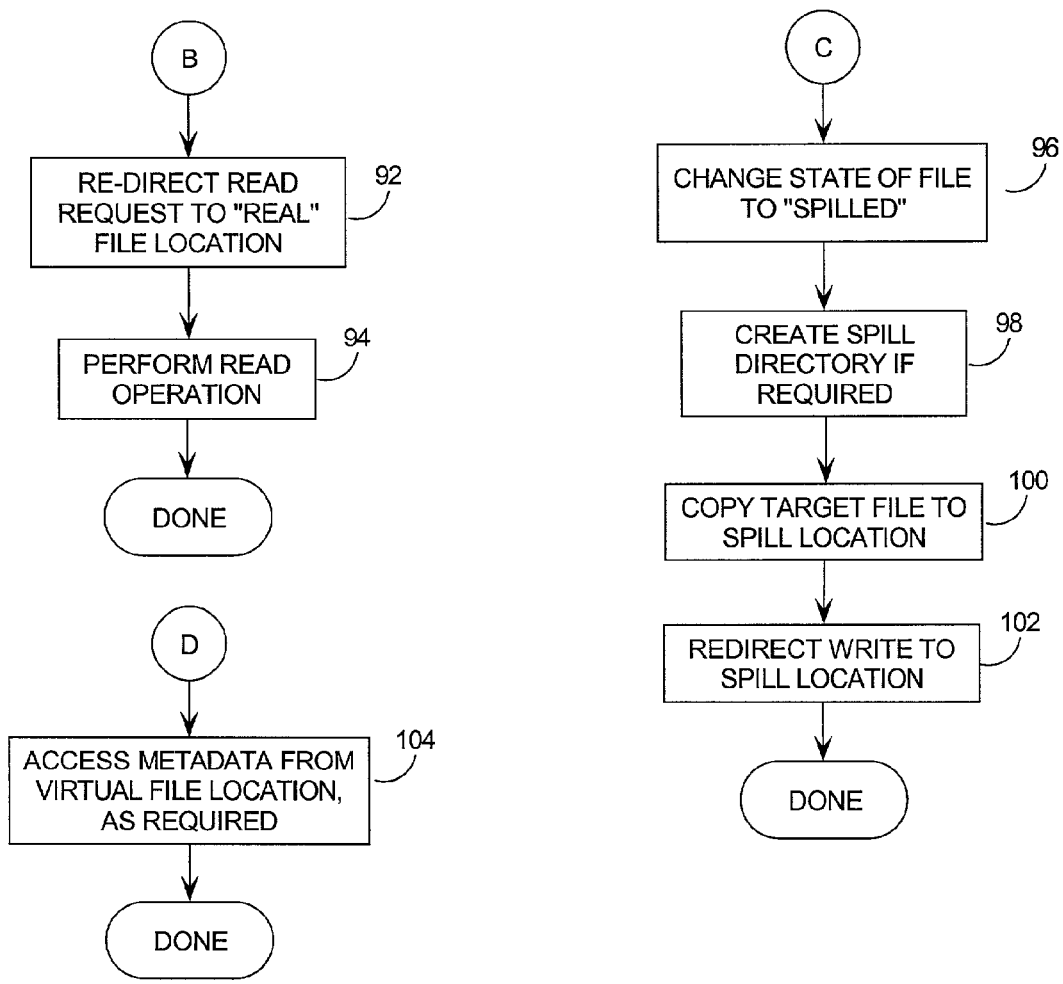

The operation of the invention in response to a request from a system is now described with respect to FIGS. 7*a* and 7*b*. This description presupposes that a system configuration file has been processed in the method of FIG. 6 or in some manner to arrive at comparable system data, and that the package configuration files for this configuration have also been processed.

The routine begins with step 70, where the system loads the system configuration file. This system configuration file describes the location of the package repositories, the packages to include, the root of the custom file system as well as the spill directory root. This step may not be performed specifically as part of a routine which handle the system's requests, but may be performed, for example, as part of the boot-up routine for the system.

The identified software packages are then loaded into a custom pathname tree at step 72. Based on the static and dynamic characteristics those package configuration files are opened and their configuration and information files read as part of the startup. These package configurations describe which files are to be presented and where those files should appear in the custom file system. As part of this step, the custom file system is mounted at the desired location or the mountpoint identified in the system configuration file. Steps 70 and 72 are described in greater detail with respect to FIG. 6.

When a client program wants to interact with the file system, be it for loading an executable program to run or reading a file, a request is made to the file system to "open" the file. Thus, the system waits for such a request at step 74.

When such a request is received, the file system will pull out filtering characteristics from the system per step 76. These filtering characteristics are the dynamic components described in the packages. The packages supply the roles and the client supplies the data. These include, but are not limited to: chip architecture, endianness, operating system revision and network connection id. (Endianness is the order in which data values are represented in memory and in the microprocessor. That is, a "little-endian" machine is said to store the least significant bit on the lowest memory address and a "big-endian" machine stores the least significant bit on the highest memory address.)

On all requests, the file system validates the system request to determine whether the identified file is managed as part of the custom file system at step 78. If the file is not valid, an error message or similar action is taken at step 80, and control returns to step 74 to await further requests. In the preferred embodiment, there will typically be other underlying file systems active as well as the custom file system, so a search for a filename will fall through to the next lower file system if it is not found on the custom file system.

If the name is valid on the custom file system, the file system checks to see if the state of the file is known at step 82, updating it if necessary, at step 84. There may be any number of states for a file. In the preferred embodiment, there are three: "unknown", "spilled" and "normal". Initially the state of all files in the system is marked as "unknown". As a file is accessed, a query must be made to determine whether a file has been copied to a "spill" location so it can be altered by the user or system, or if it a "normal" file which has not been altered. Accordingly, the state affects the location the re-direction is made to. Other states may also be used including "cached", which indicates that a local copy of a file is available, so it is not necessary to go over the network to obtain a copy.

The file system then checks to see if the file has been spilled at step 86 of FIG. 7b, and if so, re-directs the request to the spilled file location at step 88.

As noted above, files are "spilled" by copying them to a spillroot location and re-directing the filename in the system's custom file system to the location of this copy. This allows the system (or software which is operating), to modify a file without worrying about damaging or altering the original file, which may be shared by a multitude of other systems.

There are three basic styles of requests that can be made by a system: read requests, write requests and stat requests. The system of the invention considers three different cases of open: open for read, open for write, open for access. Reads occur when the contents of the target file are not going to be modified, writes occur when the contents of the target file are potentially going to be modified and opens for access occur when the system is interested in accessing the meta-data to determine permissions, owner, access time or similar information, but not the actual data content bits of the file itself.

On a read request, the process branches via the case statement of step 90, to branch B of FIG. 7b. The file system will simply re-direct the read request to the "real" file location in some package at step 92, where it executes at step 94. This location can be to a real file system, a network file system or even another custom file system like the package file system.

In order to maintain high throughput, opens for read requests are completely re-directed to their package location. As a result, all subsequent read() function calls are sent directly to the file system which contains the actual file. This is important for updates and changes since after the initial open, the custom file system configuration can change, but as long as programs have opened up references to this file, they can continue to access it. When the target file is removed from the file system, then the re-direction will be removed as well. In the mean-time a new version of the file can be made accessible, allowing for field updates and updates of critical running software with no downtime.

The file system of the invention treats all original files as read-only to protect their integrity, as there may be many systems using these files. These files can all be located on a central server with multiple systems all reading the same files. However, at some point individual systems may wish to customize or modify files which are present in the file system, so the concept of a "spill directory" was developed. The node configuration file contains a field for the spillroot whose value is the directory serving as the root of the "spilt" file system. If no spill is present, systems are blocked from modifying files and the system is read only. The existence of the spill files, is what necessitates the state check 82 and update 84 steps described above.

Hence, when a write request is received, the method of the invention passes control to branch C of FIG. 7b. The file system will mark the file as being spilled at step 96, and if there is no suitable spill directory, create one at step 98 which mimics the attributes of the original shared file. The target file can then be copied to the spill location at step 100. Once the copy is completed then the write request can be forwarded to the spill location at step 102. Any future opens for write requests are forwarded directly to the spill location.

Whenever a system issues a write operation, or any other operation which would potentially modify a file in the custom file system (such as UNIX commands UNLINK, CHMOD, and CHOWN) then a copy of the original file is made to a custom location in the spillroot. All subsequent opens for reading or writing accesses will now be re-directed to the spill location.

On a stat request to gather meta-data, the routine branches to branch D of FIG. 7b. The file system will draw the status information out of the custom file location, and return this information to the system. Note that the file system in this case does not perform a file re-direction, but rather performs the request on behalf of the system, actually handling the stat request itself by pulling the information from the actual file on disk when it is required.

There are a couple of reasons for doing this. First, it provides an additional layer of caching, resulting in a performance increase on these types of operations. Second, it provides a mechanism to communicate with the file system to obtain additional information that might be contained in the package description files themselves. An operation that might take advantage of this feature would be the recovery of a spilled file, restoring it back to its original state. Version information about files, utilities and packages could also be referenced this way.

Occasionally, access is made to change the meta-data. In such a case, the system of the invention makes the modifications and then treats the request the same as an open for writing request, spilling the file to the spill repository along with the updated meta information. As in the case for write, any further accesses for this particular file whose meta-data content is different from the meta-data content in the original file, will be re-directed to the new version of the file in the spill location.

It would be clear to one skilled in the art that all other file requests could be developed as a variation on one of these three actions: reading, writing and accessing.

While file accesses are optimized to re-direct access from the custom path directly to the package path of the file, directory accesses take a different route. When a directory entry is opened, it can only be for reading to obtain a listing of the names of the files in, or meta-data information about, the directory. Directories under the system of the invention are very abstract objects, much more so than file entries which eventually resolve to a file on disk. As well, directory entries are picked up from any number of disparate locations, and their meta-data is more likely to change.

ADDITIONAL ELEMENTS OF THE PREFERRED EMBODIMENT

Clearly, the invention is a broad concept and a major advance in file system management. Hence, it can be applied to lesser degrees in other applications, but it is preferably embodied as follows:

1. using a union mountpoint system, such as the QNX Neutrino which allows the custom file system to share a mountpoint with other file systems. This is advantageous for good performance, since the package file system must at times create directory entries on a real underlying media. For example, consider a custom directory entry named /bin and the situation where a system would like to add a new file to that location, /bin/myfile. Since /bin does not really exist as a real directory, the package file system must catch the initial request to write (/bin/myfile). Once detected it must create the component that it "virtualizes" (/bin) and then re-send a request to the file system to re-read that file location. This is not impossible to do with other operating systems, but it may be challenging depending on the implementation;
2. striking a balance between making the user feel comfortable/at ease with the custom file system and letting them know the true location of the files they might be manipulating. This may be done by having the custom file system not actually indicate that any of the files that it manages are not where they appear to be. Instead a set of special utility functions are provided which give status information about a file and which package is belongs to. This has the additional benefit of being able to tag extra information to the files; and
3. applying it to a network system which is transparent, so that embedded applications can access data and programs throughout the network.

With the invention, the system end sees one unified file system, his custom file system, which is a collection of several packages, each of which is stored in its own separate location in the real file system. When a query is made for directory locations, the results are the sum/union of all of the packages which contain this entry. The system of the invention can choose what to report to a system based on various dynamic criteria originating from the client such as user id, hostname or cpu type.

The invention provides the system with a unified path hierarchy, which is much simpler to navigate. For systems administrators it means being able to easily and quickly track software installations and usage, and also makes load balancing across multiple disks, network nodes or file systems possible.

The preferred manner of the invention also allows unioning of multiple directories together. This unioning is the same as a scatter gather method for reading several locations and writing one contiguous data stream. With the invention, a read on a custom directory may trigger multiple reads on several package directories located on disk.

The method of the invention consumes very little additional memory and has a minor impact on performance. As well, the files which define its operation, the system configuration and package configuration files, are accessible and amendable.

Furthermore, the invention may be used with any combination of existing file systems to allow the system to benefit from their features such as:
compression;
stability;
robustness;
speed;and
size.

Finally, the method of the invention does not require file registries such as those used by Windows 95 and NT, which must be maintained and amended as software and software versions are changed. As well, the method of the invention does not physically manipulate the files on disk when performing software installations, as the registry system does, instead providing all applications their own clean hierarchies.

Several UNIX systems including Redhat and Debian Linux use a software packaging scheme similar to that of the invention, however, like the windows software, in order to actually change revisions of software, the files must physically be re-located. This makes updating a running system very difficult since a file may be in use while it is being updated. With the system of the invention, run-time updates are much better facilitated because all requests are forwarded to the real file location, and the software versioning and management is incorporated into the file system itself.

While particular embodiments of the present invention have been shown and described, it is clear that changes and modifications may be made to such embodiments without departing from the true scope and spirit of the invention. For example, rather than using a UNIX based operating system, a Windows based operating system may be employed. Although the preferred embodiment is generally described with respect to UNIX-based operating systems, it is evident that the system of the present invention may be applied to other operating and file systems employing a hierarchical file structure. It is also important to note that these operating systems may be implemented on a huge variety of computing devices including personal computers, personal digital assistants, television set-top boxes, telephones including cellular, cordless and Internet ready telephones, and Bluetooth devices, to name a few.

The method steps of the invention may be embodiment in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such computer diskettes, CD-Roms, Random Access Memory (RAM) and Read Only Memory (ROM) may be programmed to execute such method steps. As well, electronic signals representing these method steps may also be transmitted via a communication network.

It would also be clear to one skilled in the art that this invention need not be limited to the existing scope of computers and computer systems. Again, such implementations would be clear to one skilled in the art, and do not take away from the invention.

What is claimed is:

1. A method of operating a computer system having a main filesystem, said the method comprising:
generating a system configuration file that comprises information identifying attributes of said the computer system;
generating a custom filesystem comprising links to selected software of the main filesystem,
where the selected software is identified for linking into the custom filesystem based on information provided through the system configuration file:
using the links of the custom filesystem to generate requests relating to the selected software;
responding to a the request generated using at least one of the links by:

intercepting the request in the custom filesystem before processing, if any, of the request by the main filesystem, and using the custom filesystem to access a real file location corresponding to the link.

2. The method of claim 1, wherein the system configuration file comprises static and dynamic system characteristics of the system.

3. The method as claimed in claim 1, where the custom filesystem responds to a request to modify a file linked in the custom filesystem by copying the file to a spill directory.

4. The method of claim 3, where the custom filesystem uses the modified file stored in the spill directory in response to further requests relating to the modified file.

* * * * *